Oct. 23, 1962 — O. A. SANDVEN — 3,060,395

STRAIN GAGE

Filed Dec. 8, 1960

INVENTOR.
OLE A. SANDVEN
BY
ATTORNEYS

3,060,395
STRAIN GAGE
Ole A. Sandven, Boston, Mass., assignor to Ilikon Corporation, Natick, Mass., a corporation of Delaware
Filed Dec. 8, 1960, Ser. No. 74,620
7 Claims. (Cl. 338—2)

This invention relates to strain gages, and more particularly, to a novel and improved bonded strain gage.

The use of strain gages has become widespread in recent years. One of the most common types of strain gage is the bonded gage which, as its name implies, is, in a suitable manner, bonded directly to a test article. A conventional bonded strain gage comprises a grid of piezo resistive wire which is connected in a bridge circuit so that upon deformation of the gage the bridge output will vary as a function of strain. When a gage is properly bonded to the test article, the output will vary with the stress imposed on the test article.

The mounting or bonding of the gage to the test article is critical because a completely tight and rigid bond is necessary in order to obtain sufficiently accurate results. Any slip in the bond will render the actual strain of the test article wholly, or at least partially, undetected by the strain gage. The provision of a good bond is not particularly difficult where the ambient temperature is relatively low, inasmuch as suitable materials and methods exist for obtaining good low temperature bonds. However, where the ambient temperature of the test article is relatively high, for example, 800° F. and higher, the conventional bonding materials are not satisfactory, and often fail at least partially. Also, the exposure of the strain gage material to these higher temperatures may have an adverse effect on the strain gage material thus causing unpredictable errors in gage output.

Accordingly, it is the primary object of this invention to provide a novel and improved strain gage which may be readily bonded to a test article, and which will remain firmly fixed to the article even under high temperature test conditions.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 1:
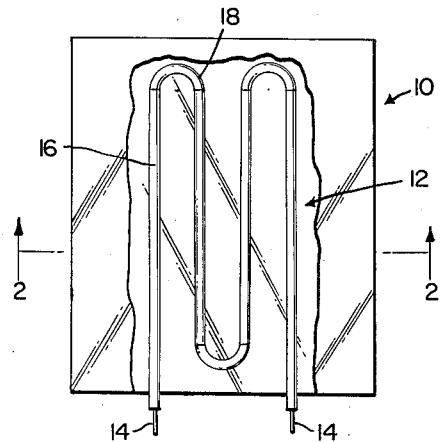
FIG. 1 is a plan view, partly cut away, of a strain gage constructed in accordance with this invention.
Figure 2:
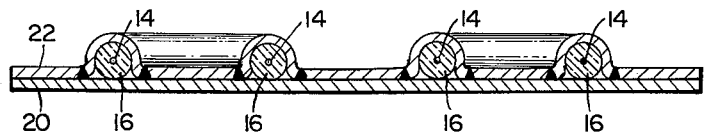
FIG. 2 is an enlarged fragmentary cross sectional view substantially along the line 2—2 of FIG. 1.

With reference to the drawing, and particularly FIGS. 1 and 2, an exemplary strain gage constructed in accordance with the invention is generally indicated at 10. The gage comprises a piezo resistive member 14 which, in the specific embodiment shown, is a wire fabricated of strain gage material, and formed into a convoluted grid configuration. As can be seen from FIG. 1, the grid comprises a plurality of parallel linear portions with the next adjacent linear portions being connected by curved or bight portions 18. The piezo resistive element may be fabricated of any suitable strain gage material such as a platinum-rhodium alloy or a Nichrome alloy. Also, if desired, it may be possible to utilize piezo resistive semi-conductive materials such as silicon or germanium as the strain gage element.

In accordance with the invention, the strain gage 14 is provided with an electrically insulating sheath. The sheath comprises linear leg members 16 surrounding the linear portions of the grid. More specifically, and as shown in FIG. 1, the leg members 16 are generally cylindrical members having a bore, the side walls of which tightly fit around the wire 14 so as to be in intimate contact therewith. Accordingly, any deformation of the leg members 16 will be reflected by a corresponding deformation in the strain sensing wire 14. The leg members are fabricated from a suitable electrically non-conductive refractory material. Specific material suitable for this use is a glass-like material having a high softening point such as a fused quartz which is sold under the tradename of Vycor by Corning Glass Works. It is preferred that ceramic materials be avoided because of the possible diffusion of silicate and carbides into the strain sensing wires at elevated temperatures. Also, it is usually difficult to fabricate ceramic materials into the capillary-like structure of the leg members 16.

The sheath for the grid further comprises curved members 18 which, in accordance with the invention, are separate from the leg members 16, thus permitting relative movement therebetween. The curved members 18 surround the curved portions of the grid. Like the leg members 16, the curved members 18 have a central bore, the side walls of which are in intimate contact with the wire 14.

Further in accordance with the invention, the gage comprises a covering including a pair of overlying layers 20 and 22 of a weldable metal foil. The foil layers are engaged on opposite sides of the sheath so as to sandwich the sheath therebetween. As most clearly shown in FIG. 2, at least one of the layers of foil is deformed about the sheath so as to generally conform to the same, and is welded to the other layer of foil closely adjacent to and along the sheath. The sheath is thus firmly fixed to the covering for deformation therewith. The marginal edges of the foil layer extend beyond the sheath pattern and the foil layers are suitably joined such as by welding.

Figure 3:
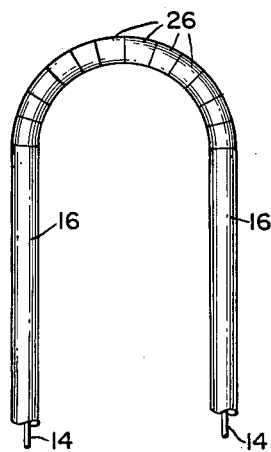
FIG. 3 is a fragmentary view of an alternate construction of one of the elements of the strain gage of FIG. 1.

In accordance with the invention, the gage of FIGS. 1 and 2 is readily applied to a test article by welding the foil covering to the test article. In this connection, and further in accordance with the invention, the foil material is selected so as to have a coefficient of thermal expansion which is substantially the same as that of the test article. Where possible, it is preferred that the foil be fabricated from the same material as the test article. As will be apparent, when the test article undergoes a strain, that strain will be reflected by corresponding deformation of the coil covering, and thus, the sheath, and finally the strain sensing element 14. The provision of the separate linear and curved members 16 and 18 of the sheath permits elongation of the gage in the direction of the linear members without risk of fracture of the sheath as might be the case if the sheath were fabricated as a one-piece structure. In this connection, the curved member 18 is normally formed by inserting the strain sensing element in a linear capillary member and then bending the capillary member in the presence of heat to obtain the desired curve configuration. An alternative construction for the curved members of the sheath is shown in FIG. 3, where the curved members are formed by a plurality of short linear capillary members 26 each having a length which is only a fraction of the length of the curved members. With the construction of FIG. 3, the short linear capillary members 26 are slipped over the strain sensing wire 14 and engaged in end to end abutment whereupon the assembly is merely bent into the curve configuration without requiring the use of heat.

From the above it can be seen that there has been provided a novel and improved strain gage of the bonded type which may be mounted on a test article by welding so as to provide a rigid bond, both at low temperatures and at high temperatures. The gage wire is fully protected from the atmosphere of the test environment, thus eliminating any adverse affects on the wire which might be caused by operation of the gage at elevated temperatures. In this connection, the sheath material is selected to assure that the sheath will not have an adverse effect on the strain sensing element as a result of exposure of the gage to the maximum operating temperature. The fabrication of the foil covering from material having substantially the same coefficient of thermal expansion as the test article minimizes, if not substantially eliminates, any differential expansion between the test article engaged, which could cause a weakening or fracture of the bond between the two. Also, the welding of the gage to the test article is facilitated where the foil and the test article are of the same material.

Inasmuch as many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:

1. A high temperature strain gage of the bonded type, consisting of an elongated piezo resistive member formed in a grid having linear portions joined by curved portions, an electrically insulating sheath surrounding said piezo resistive member in intimate contact therewith, said sheath being formed by a plurality of initially unconnected members including linear members surrounding said linear portions of the grid and separate curved members surrounding the curved portions of the grid, and a covering for the gage including a pair of overlying layers of weldable metal foil engaged on opposite sides of the sheath to sandwich the sheath therebetween, the sheath being joined to said covering for deformation therewith, the marginal edges of said covering extending beyond the sheath pattern to facilitate welding of the gage to a test article.

2. A high temperature strain gage of the bonded type, consisting of an elongated piezo resistive member formed in a grid having linear portions joined by curved portions, an electrically insulating sheath surrounding said piezo resistive member in tintmate contact therewith, said sheath being formed by a plurality of initially unconnected members including linear members surrounding said linear portions of the grid and separate curved members surrounding the curved portions of the grid, and a covering for the gage including a pair of overlying layers of weldable metal foil engaged on opposite sides of the sheath to sandwich the sheath therebetween, at least one of said layers of foil being deformed over the sheath so as to generally conform to the same and being welded to the other layer along and closely adjacent to the sheath so as to fix the sheath to the covering for deformation therewith.

3. A high temperature strain gage of the bonded type, comprising an elongated piezo resistive member formed into a grid having a plurality of parallel spaced apart linear portions with the next adjacent linear portions being joined by bight portions, an electrically insulating sheath of fused quartz surrounding said piezo resistive member in intimate contact therewith, said sheath being formed by a plurality of initially unconnected members including linear members surrounding said linear portions of the grid and separate one piece curved members surrounding each of the bight portions of the grid, and a covering for the gage including a pair of overlying layers of weldable metal foil engaged on opposite sides of the sheath to sandwich the sheath therebetween, the sheath being joined to said covering for deformation therewith, the marginal edges of said covering extending beyond the sheath pattern to facilitate welding of the gage to a test aritcle.

4. A high temperature strain gage of the bonded type, comprising an elongated piezo resistive member formed into a grid having a plurality of parallel spaced apart linear portions with the next adjacent linear portions being joined by bight portions, an electrically insulating sheath of fused quartz surrounding said piezo resistive member in intimate contact therewith, said sheath being formed by a plurality of initially unconnected members including linear members surrounding said linear portions of the grid and a plurality of short individual members each separate from the other and from said linear members of the sheath and arranged end-to-end in surrounding relation to each of the bight portions of the grid, and a covering for the gage including a pair of overlying layers of weldable metal foil engaged on opposite sides of the sheath to sandwich the sheath therebetween, the sheath being joined to said covering for deformation therewith.

5. A high temperature strain gage of the bonded type, comprising an elongated piezo resistive member formed in a grid having linear portions joined by curved portions, an electrically insulating sheath surrounding said piezo resistive member in intimate contact therewith, said sheath being fabricated from a glass-like material which will not have an adverse affect on the piezo resistive member at the maximum intended operating temperature of the gage, said sheath including linear members surrounding said linear portions of the grid and separate curved members surrounding the curved portions of the grid, and a covering for the gage including a pair of overlying layers of weldable metal foil engaged on opposite sides of the sheath to sandwich the sheath therebetween, at least one of said layers of foil being deformed over the sheath so as to generally conform to the same and being welded to the other layer along and closely adjacent to the sheath so as to fix the sheath to the covering for deformation therewith.

6. A high temperature strain gage adapted to be bonded to a test article and comprising an elongated piezo resistive member formed in a grid having linear portions joined by curved portions, an electrically insulating sheath surrounding said piezo resistive member in intimate contact therewith, said sheath being formed by a plurality of initially unconnected capillary members including linear members surrounding said linear portions of the grid and separate curved members surrounding the curved portions of the grid, and a covering for the gage including a pair of overlying layers of weldable metal foil engaged on opposite sides of the sheath to sandwich the sheath therebetween said layers of foil having a temperature coefficient of expansion which is substantially the same as that of the material of the test article with which the gage is to be used, the sheath being joined to said covering for deformation therewith, the marginal edges of said covering extending beyond the sheath pattern to facilitate welding of the gage to a test article.

7. In combination with a metal test article; a strain gage bonded to the test article and comprising, a grid structure including a strain gage wire, an electrically insulating sheath covering said wire in intimate contact therewith, said grid including a plurality of linear portions and connected by curved portions, said sheath comprising linear members corresponding to said linear portions of the grid and separate members corresponding to said curved portions of the grid, and a covering for the grid including a pair of overlying layers of metal foil having substantially the same coefficient of thermal expansion as said test article, said layers of foil being engaged on opposite sides of said grid to sandwich the same therebetween, means fixing said sheath to said covering for deformation therewith, said covering being welded to said test article for deformation therewith.

References Cited in the file of this patent

UNITED STATES PATENTS

| | | |
|---|---|---|
| 2,344,648 | Simmons | Mar. 21, 1944 |
| 2,566,335 | Joerren | Sept. 4, 1951 |
| 2,569,714 | Gregory | Oct. 2, 1951 |
| 2,728,833 | Dickey | Dec. 27, 1955 |
| 2,935,709 | Paine | May 3, 1960 |